United States Patent [19]

Murakami et al.

[11] Patent Number: 5,130,797
[45] Date of Patent: Jul. 14, 1992

[54] DIGITAL SIGNAL PROCESSING SYSTEM FOR PARALLEL PROCESSING OF SUBSAMPLED DATA

[75] Inventors: Tokumichi Murakami; Koh Kamizawa; Hideo Ohira; Kohji Ogura; Naoto Kinjo; Takao Wakabayashi, all of Kanagawa, Japan

[73] Assignee: Mitsubishi Denki Kabushiki Kaisha, Tokyo, Japan

[21] Appl. No.: 483,840

[22] Filed: Feb. 23, 1990

[30] Foreign Application Priority Data

| Feb. 27, 1989 | [JP] | Japan | 1-45632 |
| Mar. 31, 1989 | [JP] | Japan | 1-81851 |
| May 29, 1989 | [JP] | Japan | 1-132646 |
| Oct. 16, 1989 | [JP] | Japan | 1-268406 |

[51] Int. Cl.⁵ ................................ H04N 7/12
[52] U.S. Cl. ................. 358/133; 358/105; 358/138; 358/135; 358/136
[58] Field of Search ............ 358/133, 138, 135, 136, 358/105; 364/748, 749, 736

[56] References Cited

U.S. PATENT DOCUMENTS

| 4,437,165 | 3/1984 | Onodera | 364/749 |
| 4,442,498 | 4/1984 | Rosen | 364/749 |
| 4,502,115 | 2/1985 | Eguchi | 364/749 |
| 4,761,755 | 8/1988 | Ardini, Jr. et al. | 364/749 |
| 4,789,957 | 12/1988 | Niehaus et al. | 364/749 |
| 4,797,740 | 1/1989 | Harasaki et al. | 358/133 |
| 4,800,517 | 1/1989 | Asghar et al. | 364/749 |
| 4,878,230 | 10/1989 | Murakami et al. | 358/136 |
| 4,890,220 | 12/1989 | Nakagawa et al. | 364/749 |
| 4,963,030 | 10/1990 | Makur | 358/133 |

OTHER PUBLICATIONS

T. Murakami et al., "A DSP Architecture for 64 KBPS Motion Video Codec", ISCAS '88, pp. 227–230.

T. Murakami et al., "A DSP Architectural Design for Low Bit-Rate Motion Video Codec", IEEE Trans. CAS-36, No. 10 (1989), pp. 1267–1274.

*Primary Examiner*—Victor R. Kostak
*Attorney, Agent, or Firm*—Rothwell, Figg, Ernst & Kurz

[57] ABSTRACT

A video codec system inputs consecutively frame after frame of sub-sampled video data obtained by sub-sampling video data in units of frames. The video data is coded in parallel by internal coding circuits. This averages the numbers of significant pixels in the sub-sampled video data to be processed. The coded video data is composed so as to comply with specifications of the receiving equipment. Upon transmission, the data is again sub-sampled depending on the number of coding circuits on the receiving side. Each piece of the sub-sampled data is given a header for consecutive transmission. This allows for a certain period of time between pieces of data that arrive at the receiving side, thereby eliminating time differences in receiving and coding.

3 Claims, 14 Drawing Sheets

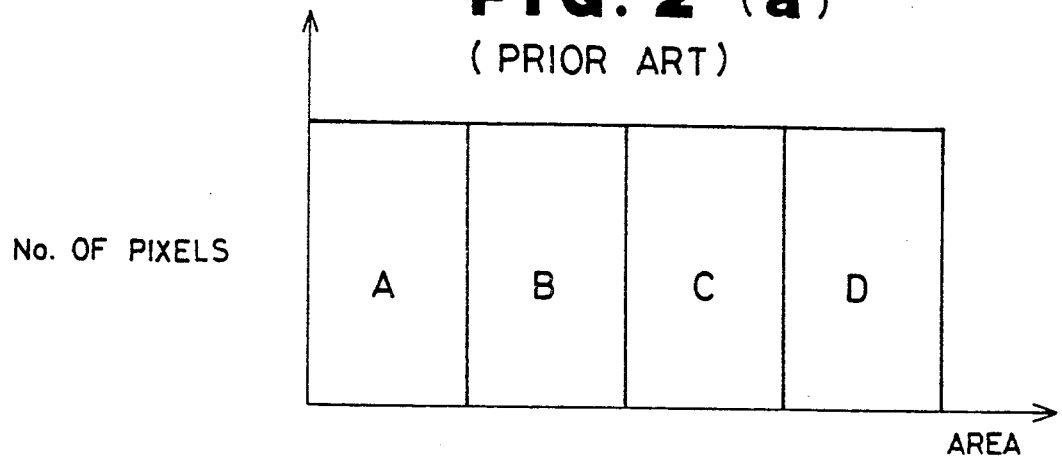
FIG. 2 (a) (PRIOR ART)
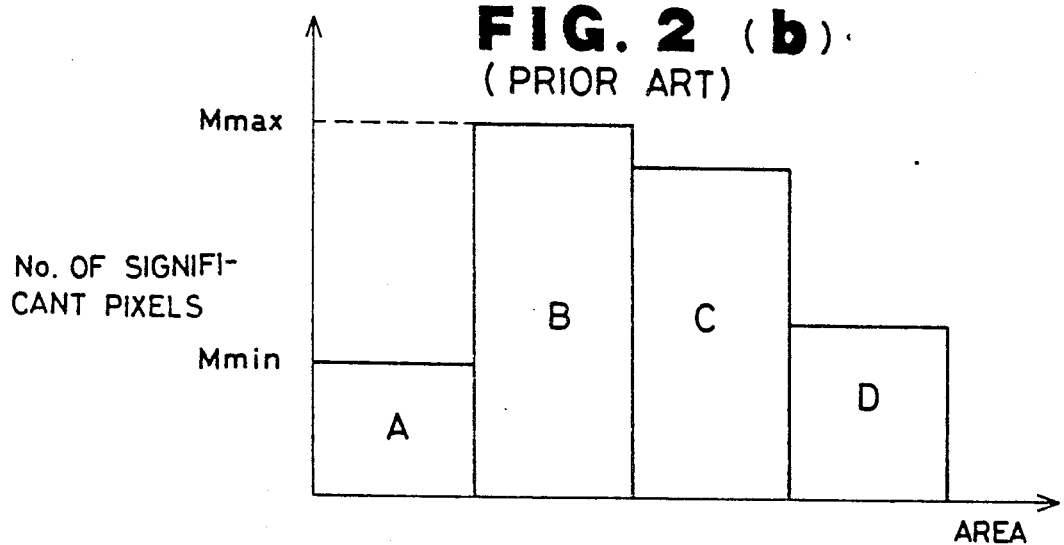
FIG. 2 (b) (PRIOR ART)
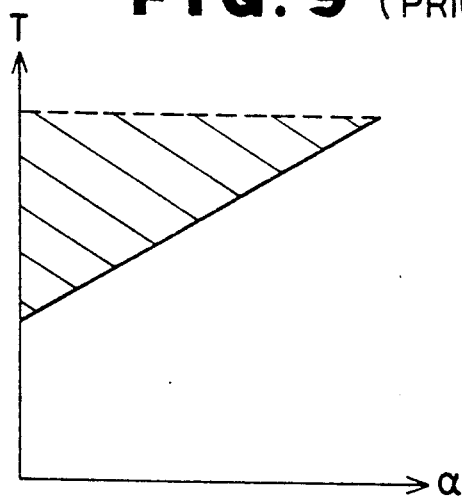
FIG. 9 (PRIOR ART)

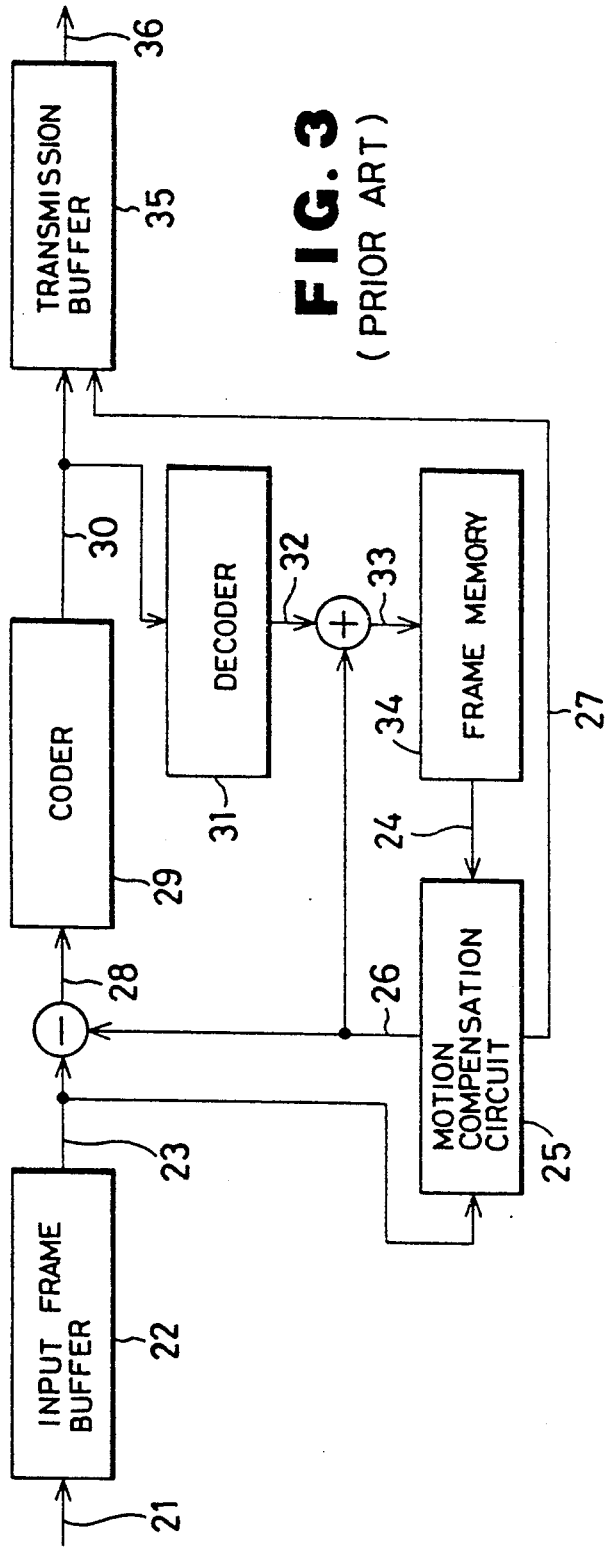
FIG. 3 (PRIOR ART)
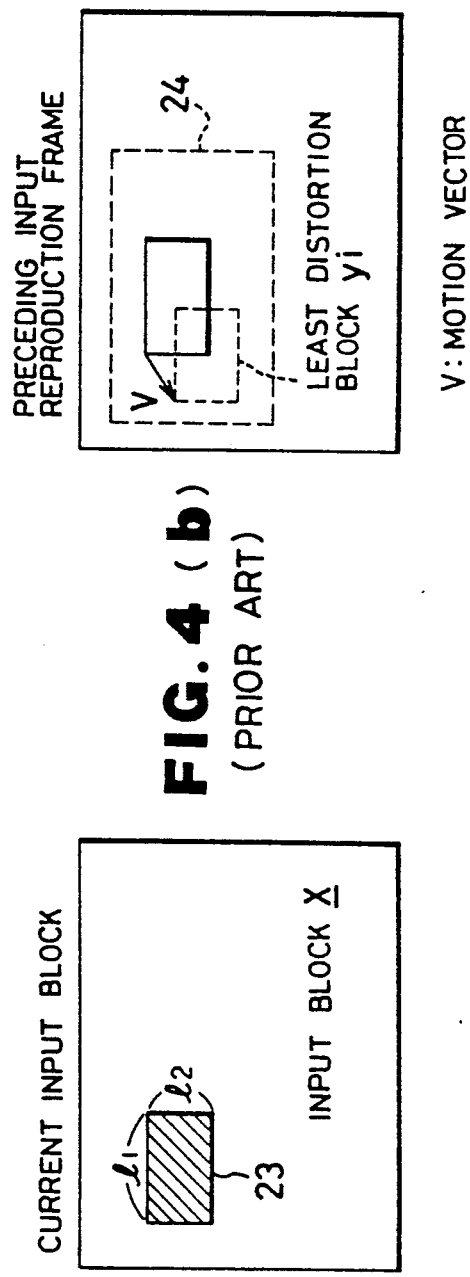
FIG. 4(a) (PRIOR ART)
FIG. 4(b) (PRIOR ART)

○ : FIRST BLOCK TO BE SEARCHED FOR
□ : SECOND BLOCK TO BE SEARCHED FOR
△ : THIRD BLOCK TO BE SEARCHED FOR

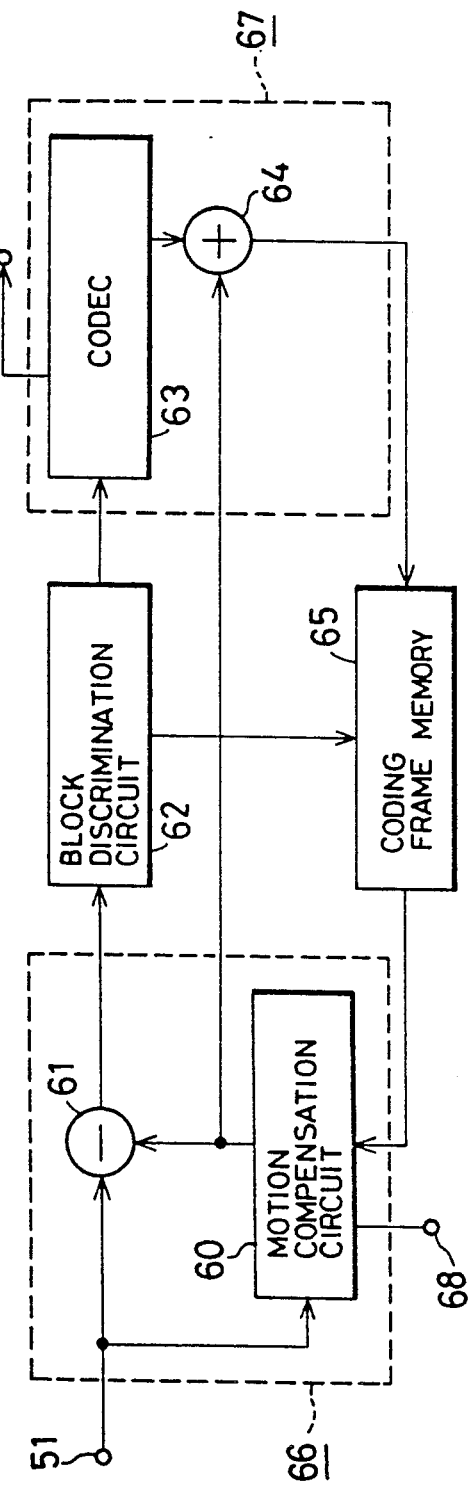
FIG. 7 (PRIOR ART)
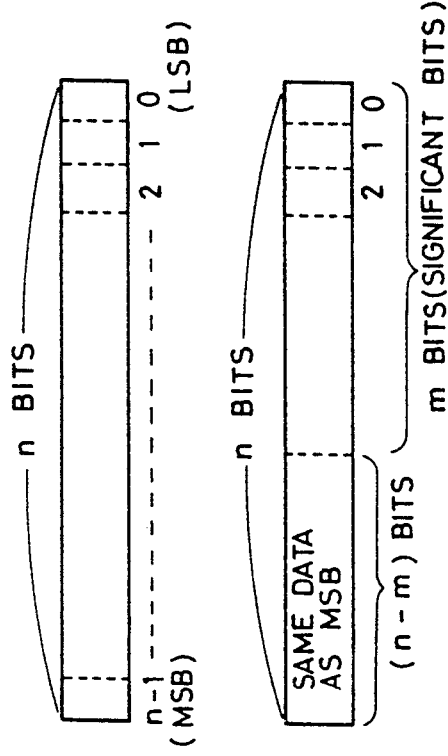
FIG. 12 (a) (PRIOR ART)
FIG. 12 (b) (PRIOR ART)

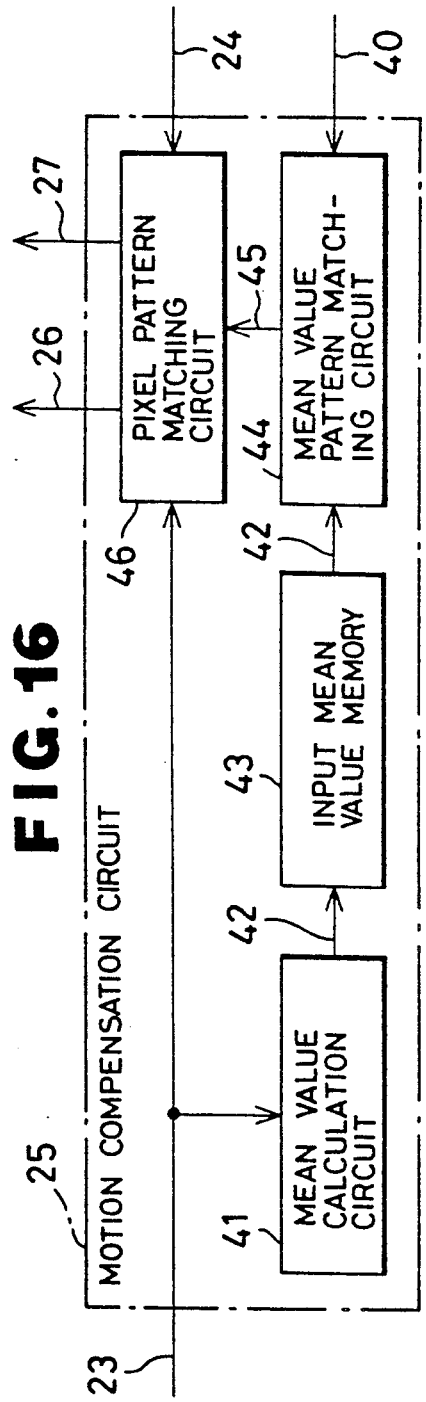
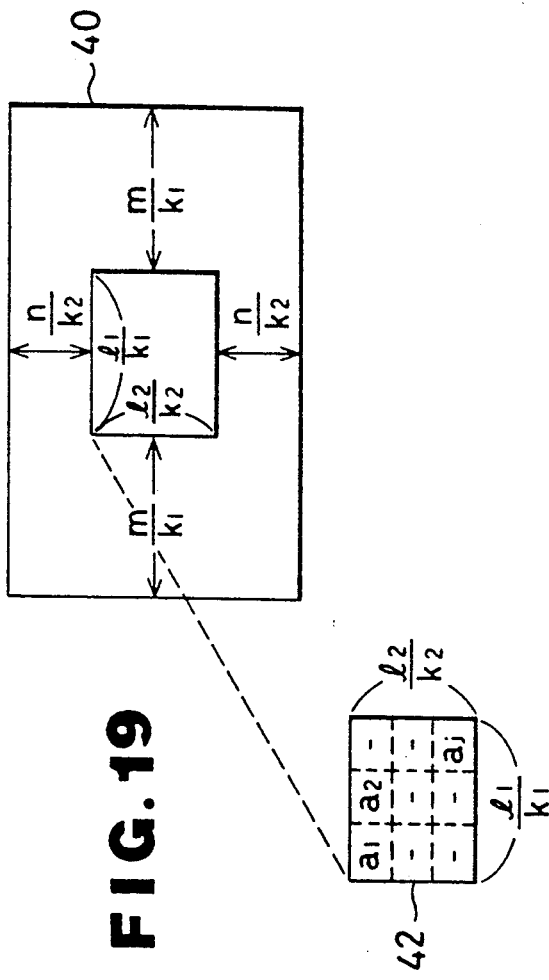

O: MOTION VECTOR FOR FIRST STAGE SEARCH

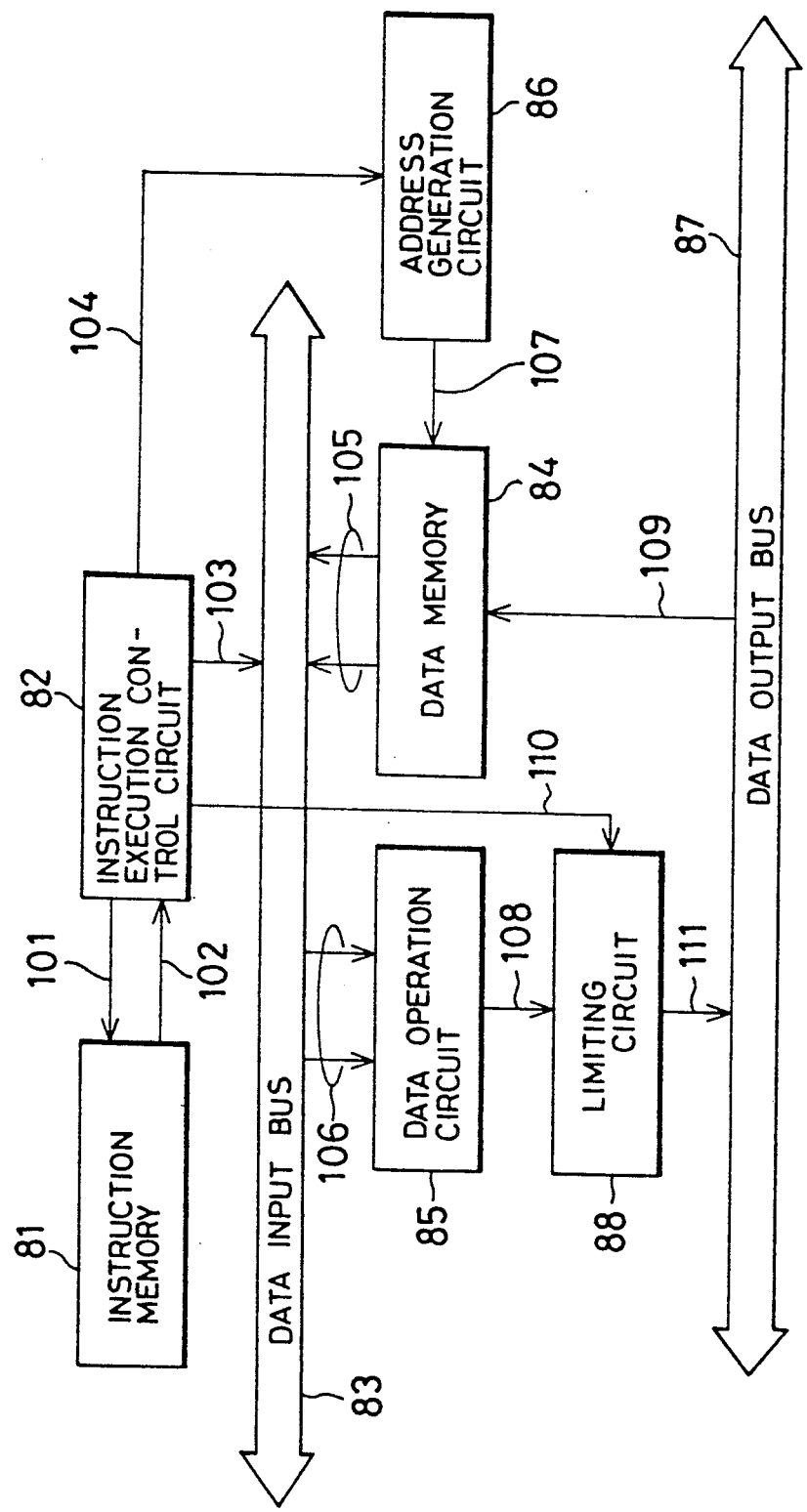

DIGITAL SIGNAL PROCESSING SYSTEM FOR PARALLEL PROCESSING OF SUBSAMPLED DATA

BACKGROUND OF THE INVENTION

1. Field of the Invention

The present invention relates to a digital signal processing system and, more particularly, to a video codec system which turns input video data into divisions thereof, the divisions being coded in parallel and composed again for transmission to a receiving side.

2. Description of the Prior Art

FIG. 1 is a block diagram of a video coder implementing a typical prior art video codec method illustratively shown in "A Real-time Video Signal Processor Suitable for Motion Picture Coding Applications" (IEEE GLOBECOM '87, pp. 453-457, 1987). In this figure, reference numeral 1 is input video data; 2 is a plurality of digital signal processors (DSP's) which are disposed in parallel and which code the input video signal in parallel; 3 is a pair of data transfer controllers for controlling the division of the data and the transfer thereof to the DSP's 2; 4 is the data to be transferred from the data transfer controllers 3 to each of the DSP's 2; and 5 is the data processed by the DSP's 2.

In operation, the data transfer controllers 3 turn a single frame of the input video data 1 into divisions and distribute them to the DSP's 2. After being processed by the DSP's, the transferred data 4 is forwarded as the processed data 5 to the next processing block. FIG. 2(a) shows the data area to be processed by each of the DSP's 2. As indicated, the input video data 1 is turned in this case into four divisions, A through D, for parallel processing by the DSP's 2. All DSP's equally share the burden of the processing. The four areas constitute the single frame of the input video data 1 that was divided earlier.

A case may be assumed in which the input video data 1 is coded by a prior art interframe video coding method or its equivalent. This method generally involves conditional pixel picture-element replenishment or compensation processing. That is, what is coded by this method is only those portions of video data whose differential between a given input frame and its preceding frame exceeds a certain level of magnitude; the remaining data portions are replaced by the previous frame data when coded. There may thus occur a case where the number of pixels is the same for the areas to be covered by the DSP's 2 but the amount of operation needed to perform the processing is not the same for these areas. In that case, the amount of operational requirements or the required operation time is proportional to the rate of effective pixels.

FIG. 2(b) is an example of how effective pixels are distributed where the input video data 1 is turned into four divisions, A through D, by the interframe coding method. The time required for the DSP's 2 to operate on each block of data is equivalent to the time taken by the DSP 2 whose number of effective pixels is the largest.

Where the numbers of effective pixels are unevenly distributed or vary overtime throughout single frame input video data, the prior art video codec method, structured as outlined above, has been dependent for its processing time on the performance of the DPS whose processing time is the longest. A disadvantage of this scheme is that the overall processing efficiency per frame tends to be reduced Another disadvantage is that where coding extends across different processing areas, the coordination of processes between the DPS's becomes complicated.

FIGS. 3 through 5 are views explaining how a typical prior art motion compensation method works, an example thereof being found illustratively in "Interframe Coding Using Motion Compensation and Predictive Coding" (Hideo Kuroda, Naoki Takekawa, Hideo Hashimoto; 85/1 Vol. J68-B No. 1, pp. 77-84; periodical of the Japan Society of Telecommunications Researchers). This example describes in particular a way to carry out a full or total search algorithm.

In FIGS. 3 through 5, reference numeral 21 is an input signal that conveys input video data; 22 is an input frame buffer that temporarily stores a single frame of input data; and 23 is a current input block with a block size of 11×12 for motion compensation at a given location in the current input frame. Reference numeral 24 is a motion vector search range delimited by the limits 11+2m, 12+2n within which exists a block to be matched with the current input block 23 in preceding input frame reproduction data. In this case, the number of blocks (M blocks) to be searched for is given as $$M = (2m+1) \times (2n+1) \quad (100)$$

Thus the search range is between $-m$ and $+m$ pixels horizontally, and between $-n$ and $+n$ pixels vertically.

Motion compensation works as follows: In an interframe codec system, a frame-to-frame correlation is found between the current input frame data and the preceding input frame reproduction data. By use of this correlation, a process is performed in units of blocks to obtain the predictive signal closest to the current input frame data.

The motion vector search range 24 in the preceding input frame reproduction data is searched for the block whose block-to-block distortion is the smallest relative to the current input block, i.e., whose correlation thereto is the highest. A typical condition for this case to work is that the sum of absolute differential values be the smallest. This process provides motion vector and predictive signal data.

Also in FIGS. 3 through 5, reference numeral 25 is a motion compensation circuit that obtains a predictive signal by making correlation approximations on the current input block 23 of the input signal 21 and on the motion vector search range 24 given as the preceding input signal reproduction data; 26 is a predictive signal output by the motion compensation circuit 25; 27 is motion vector information that is also output by the motion compensation circuit 25.

Reference numeral 29 is a coder that outputs a coded signal 30 by coding a differential signal 28 derived from the difference between the input block signal 23 and the predictive signal 26; 31 is decoder that decodes the coded signal 30 following the coding by the coder 29.

Reference numeral 34 is a frame memory which adds the decoded signal 32 from the decoder 31 and the predictive signal 26 from the motion compensation circuit 25 to generate reproduction data 33 for storage, thereby providing the motion compensation circuit 25 with the vector search range 24. Numeral 35 is a transmission buffer, and 36 is a transmission signal.

Referring now to FIGS. 4 and 5, the operations involved will be further described. A block X is assumed as the current input block 23 located in a specific position inside the current input frame and measuring 11×12. With respect to the block X, there is calculated the amount of distortion among M blocks inside the motion vector search range 24 in the preceding input frame reproduction data. The calculation yields the block having the least distortion. This is the least distortion block "yi" whose position relative to the current input block 23 is obtained as a motion vector V. At the same time, a signal "ymin" corresponding to the block "yi" is output as the predictive signal 26.

The interframe codec system is also capable of generating the predictive signal 26 on the signal receiving side. For example, there may be assumed M motion vectors V to be searched for in a given motion vector search range 24, M being an integer larger than 1. In this case, the amount of distortion between the preceding frame block located in the motion vector V and the current input block is represented by the sum of absolute differential values therebetween. The distortion "di" is given as $$di = \sum_{P=1}^{L} |yiP - XP| \quad (101)$$

The input block is given as $$X = \{x1, x2, \ldots xL\}$$

The block to be searched for is given as $$yi = \{yi1, yi2, \ldots yiL\}$$

where, $i=1\sim M$, and L is equivalent to 11×12. The motion vector V is given as $$V = Vi \{min\ di| = 1\sim M\} \quad (102)$$

In the case above, the amount of operation, illustratively represented by S1, is obtained using the following expression in which "a" stands for a number of machine cycles needed to add absolute differential values and "b" for a number of machine cycles to carry out a compare operation:

$$S1 = M(L \times a + b) \quad (103)$$

An example may be assumed where a=1 machine cycle; b=2 machine cycles; l1=8; l2=8; m=8; and n=8. In that case, L=64 and M=289. As a result, one gets:

$$S1 \approx 19000 \quad (104)$$

The volume of operation S1, which thus amounts to 19,000 machines cycles, is a very large value considering the hardware configuration involved. The requirement has been met by use of high-speed operation systems featuring pipeline processing or the like in keeping with the cycles of the frames making up the video signal.

How to simplify the hardware configuration has been a big challenge. Japanese Patent Laid-open No. 63-181585, "TV Signal Motion Compensation Interframe Coding Apparatus," proposes a method for tree-search compensation in order to reduce the amount of operation involved.

As shown in FIG. 6, the prior art tree search motion compensation method involves disposing first target blocks to be searched for (○) spaced equally apart at a low concentration inside the motion vector search range 24. When the block having the least distortion is detected from among the first target blocks, second target blocks (□) are disposed within a narrowed range around the least distortion block (○). When the block having the least distortion is again detected from among the second target blocks, third target blocks (△) are disposed within a further narrowed range around the least distortion block (□). Search for and detection of the least-detection blocks thus continue, until the block having the least distortion within the motion vector search range 24, in this case block (△), is identified.

In the case above, the amount of operation S2 is given as $$S2 = \{9 \times L \times a + 9 \times b\} \times 3 \quad (105)$$

Under the same condition as given earlier, one gets:

$$S2 \approx 1800$$

The operation represented by 1,800 machine cycles available with the tree search motion compensation method is an appreciable reduction from the high operational requirement in the case of the full or total search method.

Since the prior art motion compensation method is constructed as outlined above, attempts to perform the full or total search, which is highly reliable, during motion compensation have inevitably led to vastly increased amounts of operation. This has required setting up hardware on large scales. Likewise, attempts to reduce the amount of operation by use of the tree search method or the like have resulted in the deterioration in the system's ability to detect the least distortion block. That is, there is a growing possibility that a block located away from the true least distortion block will be selected during matching operation of the initial low concentration block search. Where that scheme is employed, there have been increasing numbers of cases in which the system fails to detect the predetermined least distortion and incorrectly passes a judgment of no correlation between blocks. There has been little choice but to accept the resulting inefficiency in data transmission.

FIG. 8 is a block diagram illustratively showing a typical prior art video coding system, "Real-time Video Signal Processor Module" (in Proc. ICSSP '87, April 1987, pp. 1961-1964). In FIG. 8, reference numeral 51 is an input terminal through which input data is entered; 52 is a plurality of processors (M units) for performing signal processing of the input data; 53 is an output terminal through which the result of the processing by the processors 52 is output via an output bus; 70 is one frame of screen data to be output through the input terminal 51; and 71 is a plurality of divided windows constituting one frame of the screen data 70.

FIG. 7 is a block diagram showing a typical high efficiency coding algorithm. In this figure, reference numeral 51 is the input terminal; 60 is a motion compensation circuit that performs motion compensation on the input data from the input terminal 51; 61 is an interframe differentiation circuit that differentiates the data from the motion compensation circuit 60 and the data from the input terminal 51; 62 is a block discrimination circuit that separates the data from the interframe differentiation circuit 61 into significant and insignificant block; 63 is a codec circuit that codes and decodes the significant block data coming from the block discrimination circuit 62; 64 is an interframe addition circuit that adds the decoded data from the codec circuit 63 and the data from the motion compensation circuit 60; 65 is a coding frame memory that stores the data from the interframe addition circuit 64; 66 is a pre-processing circuit that includes the motion compensation circuit 60 and the interframe differentiation circuit 61; 67 is a post-processing circuit that contains the codec circuit 63 and the interframe addition circuit 64; and 68 is an output terminal through which the processed output data is output.

In operation, this video coding system addresses motion video signals as follows The system divides one page of screen data 70 into M windows of screen data 71 which are assigned to the processors 52. It takes a single frame time for the processors 52 to get their respective window data 71. Then it takes another single frame time for the processors 52 to carry out the necessary process required of them. The results are synchronized between the processors 52 for output onto an output bus. At this time, the individually processed window data 71 are composed again into a single frame format.

When the processing method described above is employed, the time T required to turn one frame into M divisions for processing is given as $$T \approx \text{MAX}(T_{fn}, n = 0, M) \geq \frac{T_f}{M} \tag{1}$$

where, $T_f$: time required for one processor to process one frame $T_{fn}$: time required for an n-th processor to perform its processing per window Therefore, increasing the number of data divisions allows processors 52 of a relatively low speed version to perform high speed video processing. Meanwhile, the slowest processor 52 determines the overall processing speed.

FIG. 7 thus illustrates the algorithm of a high-performance coder that addresses motion video screens. In this setup, the motion compensation circuit 60 performs motion compensation on all input data coming from the input terminal 51. After differentiation with the input data by the interframe differentiation circuit 61, only the significant blocks extracted by the block discrimination circuit 62 are sent to the codec circuit 63 for coding and decoding. At this point, the following relationship exists between the significant block ratio inside the windows α and the window processing time T:

$$T = aB_N + bB_N \frac{\alpha}{100} \tag{2}$$

where, a, b: constants $B_N$: number of blocks inside windows

FIG. 9 illustrates the relationship given by the expression (2) above. In the prior art video coding system, the processors 52 synchronize with one another in carrying out their input and output. That is, the same maximum processing time need to be assigned to each of the processors 52. As shown in FIG. 9, the system develops during operation an idle time which is represented by the area of the shaded portion.

In cases where it takes different times to perform the processing depending on the block to be processed, the prior art video coding system, structured as described above, requires assigning the longest processing time equally to each of its processors 52. This has lead to the problem of unnecessarily increasing the number of processors despite the redundancy in their performance.

FIG. 10 is a block diagram of a typical prior art digital signal processing system in its simplified form presented in "A DSP Architecture for 64 Kpbs Motion Video Codec" (International Symposium on Circuit and System, ISCAS '88, pp. 227-230, 1988). In FIG. 10, reference numeral 81 is an instruction memory that stores a microprogram instruction word; 82 is an instruction execution control circuit that reads an instruction word from the instruction memory 81, interprets it, and performs operational control accordingly; 83 is a data input bus that mainly transfers data and control signals; 84 is a data memory which stores operation data and which has a plurality of input/output ports; 85 is a data operation circuit that performs various operations on up to two pieces of input data coming from the data memory 84 via the data input bus 83; 86 is an address generation circuit that generates addresses independently for two pieces of data input to the data operation circuit 85 and one piece of data output therefrom; and 87 is a data output bus that transfers the results of the data operation.

The operations involved will now be described by referring to the flowchart in FIG. 11. This is an example in which two pieces of input data comprising "n" bits ("n" is an integer greater than 0) are subjected to a binary operation by the data operation circuit 85. The data (comprising "n" bits) resulting from the operation is subjected to a limiting process in which "m" bits ("m" is an integer equal to or greater than "n") are regarded as significant bits and handled as such.

The instruction execution control circuit 82 notifies the instruction memory 81 of the address given via an address path 101. The corresponding instruction word is read from the instruction memory 81 via a data path 102. The instruction execution control circuit 82 then interprets the instruction word that was read, provides the address generation circuit 86 with a control signal via a data path 104 and, as required, transmits data or the like onto the data input bus 83 via a data path 103.

The control signal causes the address generation circuit 86 to notify the data memory 84 of the addresses of the two pieces of input data ("n" bits each) needed for the operation together with a data path involved. In turn, the data memory 84 sends the two pieces of input data onto the data input bus 83 via a data path 105. The data operation circuit 85 receives via a data path 106 the two pieces of input data placed on the data input bus 83. The data operation circuit 85 performs the binary operation specified by the instruction execution control circuit 82 by way of the data path 103. The resulting data (of "n" bits) is transmitted to the data output bus 87 via a data path 108. The data placed on the data output bus 87 is input via a data path 109 to the data memory 84, and is stored at the address therein given by the address generation circuit 96 via a data path 107. The above processes constitute step ST1.

In step ST2, following the above-described input operation, the data operation circuit 85 admits, again via the data path 106, the operation result data from the data memory 84. The data operation circuit 85 then executes a MAX instruction (whose significant bit count is "m"), one of the instruction sets specified by the instruction execution control circuit 82. The MAX instruction is an instruction which, when executed, takes the larger of the two maximum values: one represented by the operation result data and the other by the data of "m" significant bits, and handles the chosen value as the resulting output. A check is made to see if the operation result data exceeds the maximum value. If it does, a limiting process is carried out. The above-described output operation causes the data resulting from executing the MAX instruction to be stored into the data memory 84. This completes step ST2.

In step ST3, by performing the input operation described above, the data operation circuit 85 admits again via the data path 106 the data resulting from executing the MAX instruction, the data being retrieved from the data memory 84. Then a MIN instruction (whose significant bit count is "m"), one of the instruction sets, is executed. The MIN instruction is an instruction which, when executed, takes the smaller of the two minimum values: one represented by the operation result data and the other by the significant bit count "m" and handles the value as the resulting output. A check is made to see if the operation result data is smaller than the minimum value. If it is, a limiting process is carried out. The output operation described above causes the data resulting from executing the MIN instruction to be stored into the data memory 84. This completes step ST3.

The limiting process will now be described in more detail by referring to FIG. 12. In this example, operation result data of "n" bits (MSB and LSB denote the most and the least significant bit, respectively) is assumed, as shown in FIG. 12(a). In a limiting process involving "m" significant bits (m<n), the high-order (n−m) bits are considered the data equivalent to the MSB. The remaining "m" bits are regarded as "m" bit data if the operation result data falls within a range represented by the "m" bits. If the operation result data exceeds the maximum value that can be represented by the "m" bits, the "m" bits are regarded unchanged as the "m" bit data; if the operation result data is smaller than the minimum value that can be represented by the "m" bits, the minimum value is regarded as the "m" bit data [FIG. 12(b)].

Where the significant bit count "m" equals "n", the limiting process is equivalent in effect to a case where no limiting process is carried out.

Since the prior art digital signal processing system is constructed as described above, performing the limiting process on operation result data has required executing as many as three instructions including an operation. This has led to the problem of reduced processing efficiency in prior art systems of this type.

SUMMARY OF THE INVENTION

It is therefore an object of the present invention to provide a video codec system which averages the processing times of the DSP's, parallel configured, which connects to a receiving side of low resolution, and which reduces the capacity of receiving buffers.

It is another object of the present invention to provide a motion compensation method which simplifies and reduces in size the necessary hardware that reduces the amounts of operation involved without deteriorating its ability to detect the least distortion block.

It is a further object of the present invention to provide a video coding system which attains highly efficient processing using a minimum of processors.

It is an addition object of the present invention to provide a digital signal processing system capable of performing a highly efficient limiting process.

BRIEF DESCRIPTION OF THE DRAWINGS

FIG. 2A-B is a view explaining the operation of dividing video data based on the prior art video codec method;

FIG. 3 is a functional block diagram depicting the construction of the prior art motion compensation interframe coding system;

FIGS. 4(a) and 4(b) are views illustrating the prior art motion vector detection method;

FIG. 7 is a block diagram showing a typical prior art high efficiency coding algorithm;

FIG. 9 is a view explaining how the processing time shown in FIG. 8 is related to the rate of significant blocks;

FIG. 12A-B is a view explaining the prior art limiting process;

FIG. 16 is a functional block diagram indicating the internal construction of a motion compensation circuit according to the present invention;

FIG. 19 is a view explaining how motion vector detection is carried out by use of the mean value pattern in the first stage of search;

FIG. 24 is a block diagram showing the construction of a digital signal processing system as a fourth embodiment of the present invention.

DETAILED DESCRIPTION OF THE PREFERRED EMBODIMENTS

Figure 13:
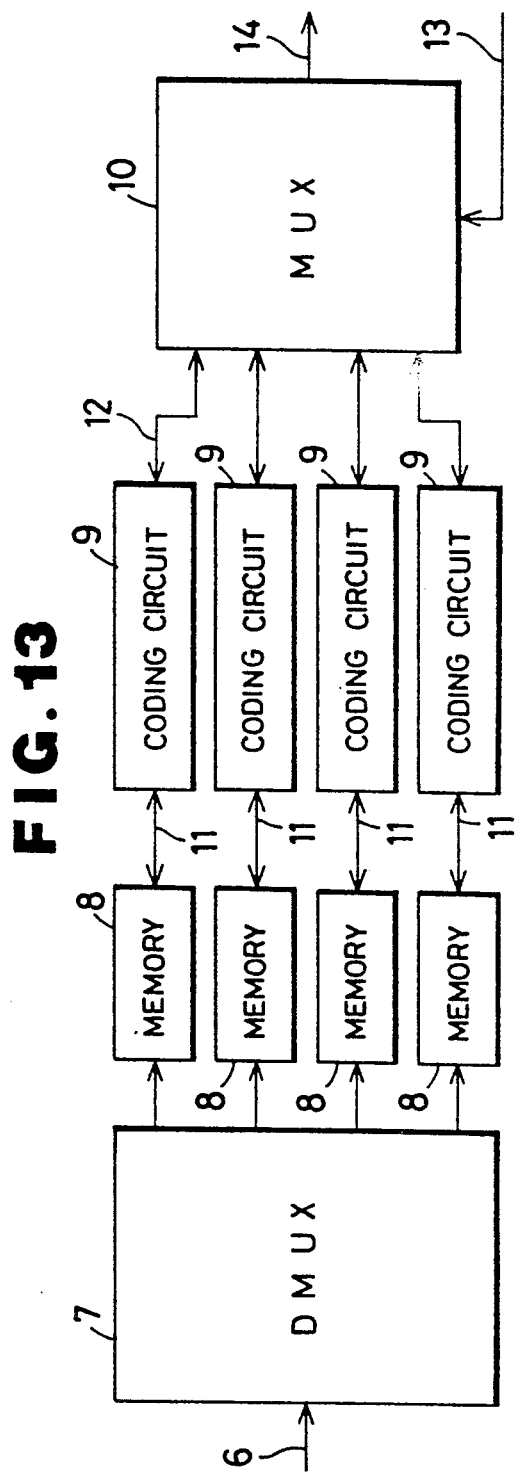
FIG. 13 is a block diagram showing the construction of a video codec method as a first embodiment of the present invention.

A first embodiment of the present invention will now be described by referring to the accompanying drawings. FIG. 13 is a block diagram showing how the video codec method according to the present invention is typically embodied In FIG. 13, reference numeral 6 is video data to be input; 7 is a data control circuit that distributes the video data 6 to coding; memories 8; 8 is a group of coding; memories that store the sub-sampled video data 6; 9 is a collection of coding circuits that code the sub-sampled video data 6 stored in the coding; memories 8; 10 is a codec control circuit that selects all of or adaptively selects part of video data 12 coded by the coding circuits 9 for in accordance with resolution of the receiving side and another sub-sampling followed by consecutive transmission; 11 is a group of address and data buses over which the coding circuits 9 read the sub-sampled video data 6 from the memories; 12 is the video data coded by the coding circuits 9; 13 is a coding mode control signal indicating whether the resolution of the receiving side is of standard or of sub-sampling type (½ resolution, ¼ resolution, etc.); and 14 is transmission data composed and again sub-sampled in accordance with the resolution of the receiving side.

Figure 14:
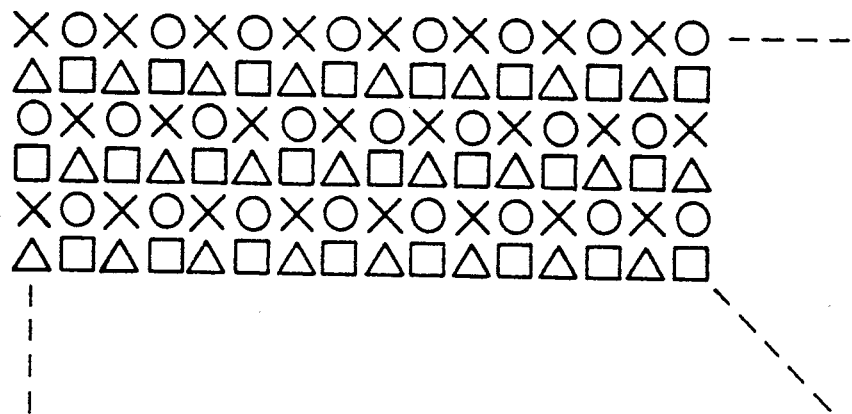
FIG. 14A-E is a view explaining a sub-sampling process according to the present invention.
Figure 14:
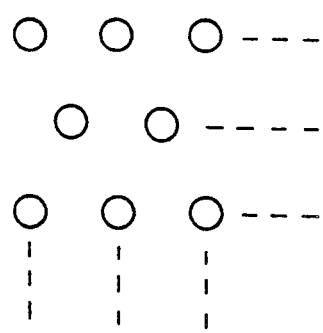
Figure 14:
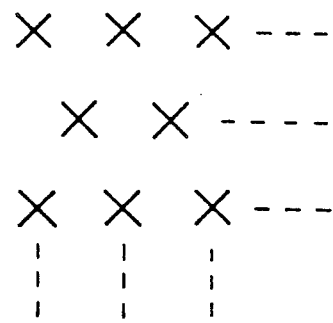
Figure 14:
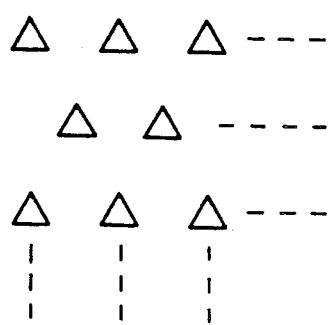
Figure 14:
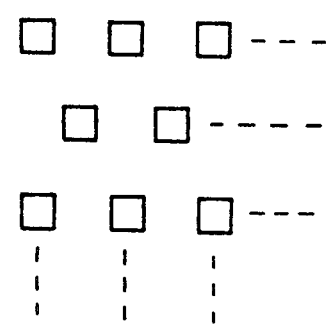

FIG. 14 illustrates a sub-sampling process in which one frame of video data is subjected to a subtracting or thinning-out operation so that the pixels involved do not overlay with one another when divided into a plurality of pieces of data. In this example, one frame of image data shown in FIG. 14(a) is divided into four pieces of sub-sampled video data [FIGS. 14(b) through 14(e): ¼ sub-sampling]. As indicated in FIG. 14(a), if one frame of video data pixels is turned into four divisions identified by symbols ○, X, △ and □, these groups constitute sub-sampled video data with ¼ resolution [¼ sub-samples, in subfigures (b) through (e)]. FIG. 14(b), for example, show a set of data obtained by subtracting the pixels X, △ and □ (other than pixels ○) from the image data of FIG. 14(a). This necessarily means that the amount of data, i.e., the number of pixels, is a quarter of the total thereof.

In operation, the data control circuit 7 consecutively admits the video data 6 in units of frames. The input data is distributed to the coding; memories 8. After being stored in the coding; memories 8, the video data 6 is read into the coding circuits 9 disposed in parallel. After coding by the coding circuits 9, the coded video data 12 is output to the codec control circuit 10. As specified by the coding mode control signal 13, all of the coded video data 12 is selected or a part thereof is adaptively selected, and is composed and again sub-sampled in accordance with the number of coding circuits that the receiving side possesses. A header is attached to the sub-sampled data before it is forwarded frame by frame as the transmission data 14.

It is now assumed that, as illustrated in FIG. 14, there are four pieces of the ¼ sub-sampled video data [FIGS. 14(b) through FIG. 14(e)]. There exist four coding circuits 9 disposed in parallel. The four pieces of sub-sampled video data are coded by the coding circuits 9 for output to the codec control circuit 10. If the coding mode control signal 13 calls for a standard mode (i.e., the resolution is the same as that of the receiving side), all four pieces of coded video data 12 are composed; if the coding mode control signal 13 calls for a ¼ sub-sample mode (i.e., the resolution of the receiving side is ¼), any one of the four pieces of the coded video data 12 may be selected (but composition thereof is not needed); if the coding mode control signal 13 calls for a ½ sub-sampling mode (i.e., the resolution of the receiving side is ½), any two of the four pieces of the coded video data 12 are selected and composed.

In the embodiment described above, ¼ sub-sampling of video data is performed. Equivalent effects are obtained by carrying out ½n (n=1, 2, 3, ...) sub-sampling.

Figure 15:
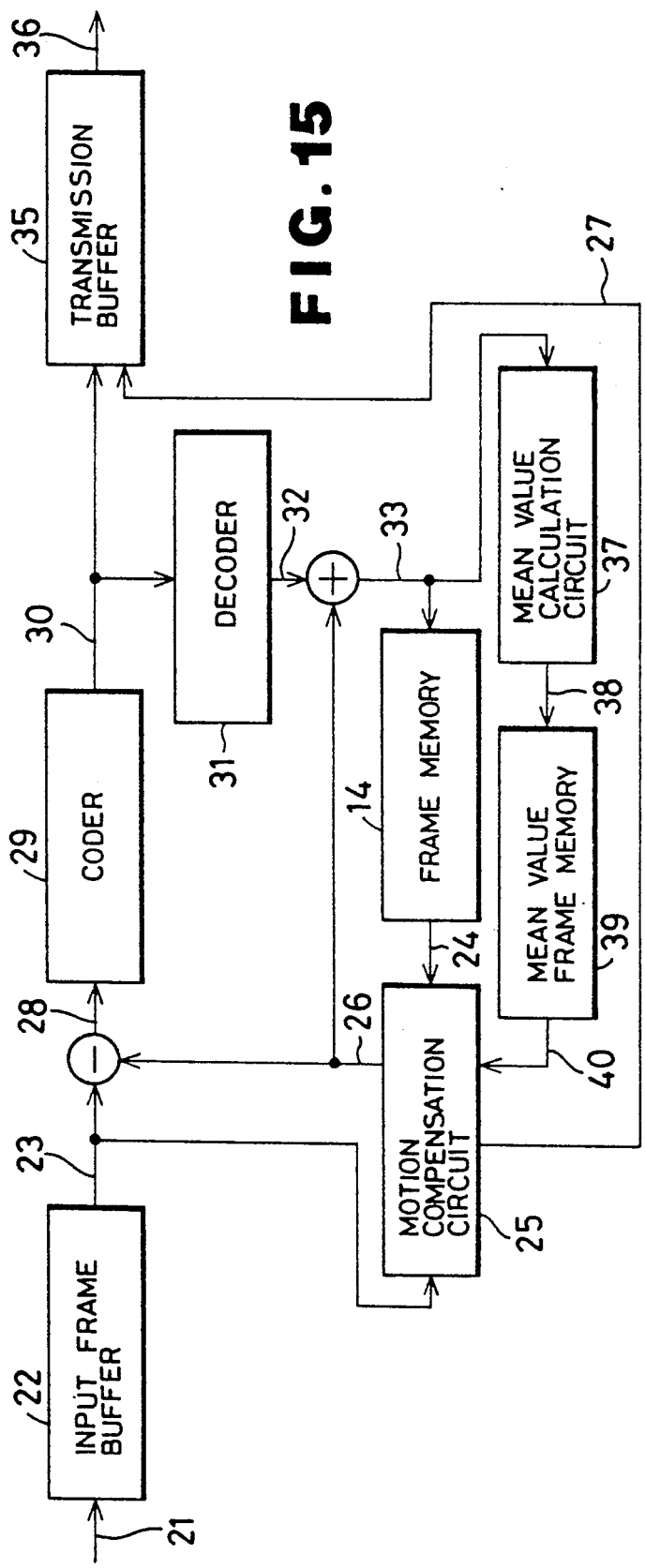
FIG. 15 is a functional block diagram showing the construction of a motion compensation interframe coding system as a second embodiment of the present invention.

FIG. 15 shows how the compensation interframe coding system is constructed as the second embodiment of the present invention. In FIG. 15, reference numeral 37 is a mean value calculation circuit which, for each reproduction frame, turns a motion compensation block measuring l1×l2 into equal parts of a predetermined size (mean value blocks) so as to find the mean pixel count 38 of each mean value block. Reference numeral 39 is a mean value frame memory that retains the mean value 38 of mean value blocks per frame.

FIG. 16 depicts the internal construction of the motion compensation circuit 25. In this figure, reference numeral 41 is a mean value calculation circuit that calculates the mean value 38 of each mean value block within the block to be coded. Reference numeral 43 is an input mean value memory that retains as a pattern each mean value of the mean value blocks within the current input block.

Reference numeral 44 is a mean value pattern matching circuit that calculates the amount of distortion between the mean value pattern of the input block and the mean value pattern in the mean value frame memory 39 so as to detect the least distortion block. Reference numeral 46 is a pixel pattern matching circuit that detects the position of the least distortion block by calculating the amount of interframe distortion between the input block and the search range compatible block in the frame memory.

Figure 18:
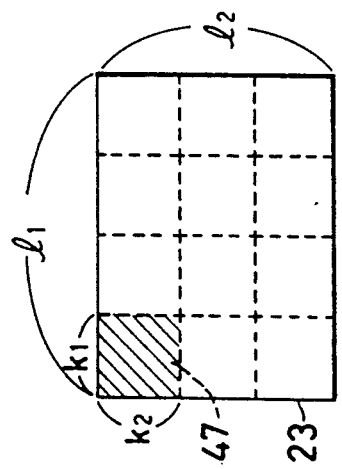
FIG. 18 is a view depicting how a mean value pattern is calculated.

FIGS. 18 and 19 show how the motion vector detection method according to the invention works in the first stage of search by use of the least distortion of the mean value pattern. In FIGS. 18 and 19, reference numeral 40 is a range of search for a reproduction frame mean value pattern; 42 is a mean value pattern of the input block; and 47 is a mean value block.

The effects of the present invention will now be described. The input signal 21 is coded by the coder 29 and decoded by the decoder 31, both conventionally, to become decoded reproduction data 33 which is stored also conventionally into the frame memory 34. At the same time, the data 33 in one frame is turned into mean value blocks 47 measuring k1×k2 each. The mean value of pixels is obtained for each mean value block as shown in FIG. 15.

A case may be assumed in which the mean value block is of a size by which a motion compensation block measuring l1×l2 may be divided into equal parts. In that case, there exist J mean values [J=(l1×l2)/(k1×k2)] within the l1×l2 block. At this time, the mean pixel value aj (j=1 to J) within each mean value block is collectively handled as a single pattern A. That is, A={a1, a2, ... aJ}.

Figure 17:
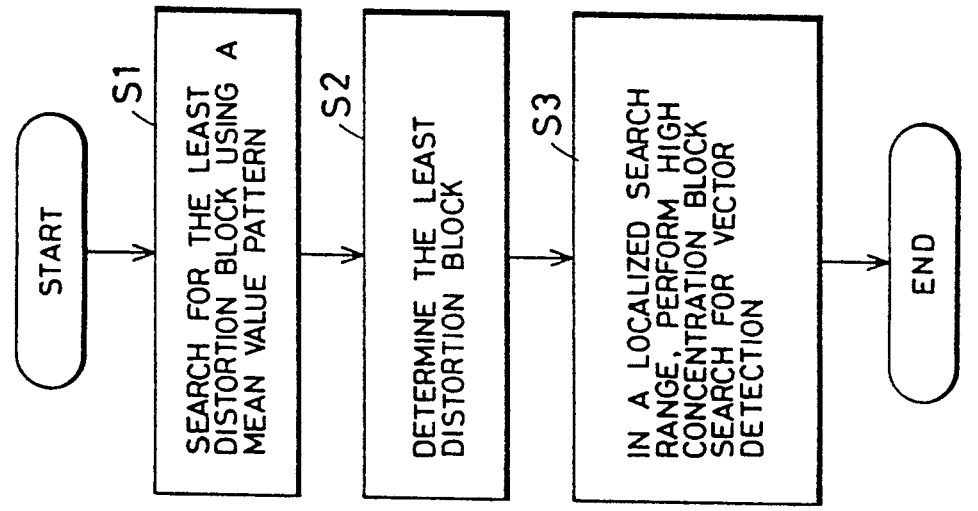
FIG. 17 is a flowchart describing how the system according to the present invention works.
Figure 11:
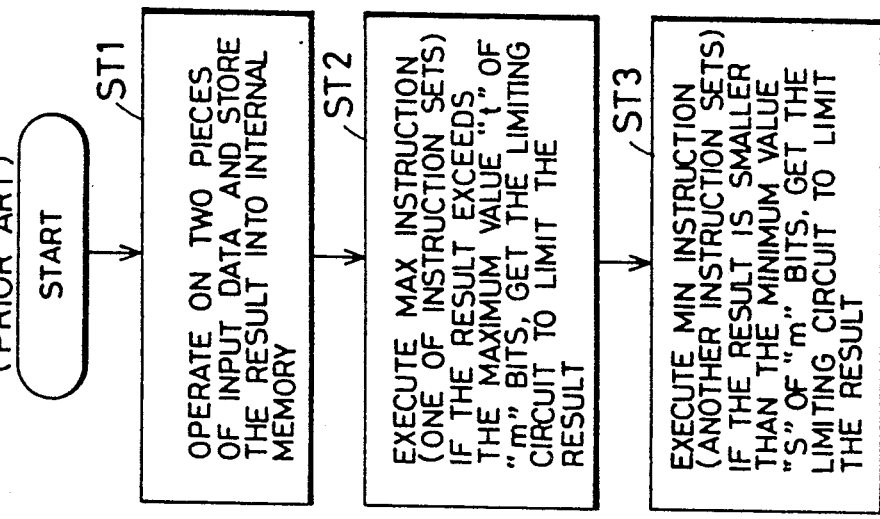
FIG. 11 is a flowchart showing how the prior art digital signal processing system operates.
Figure 20:
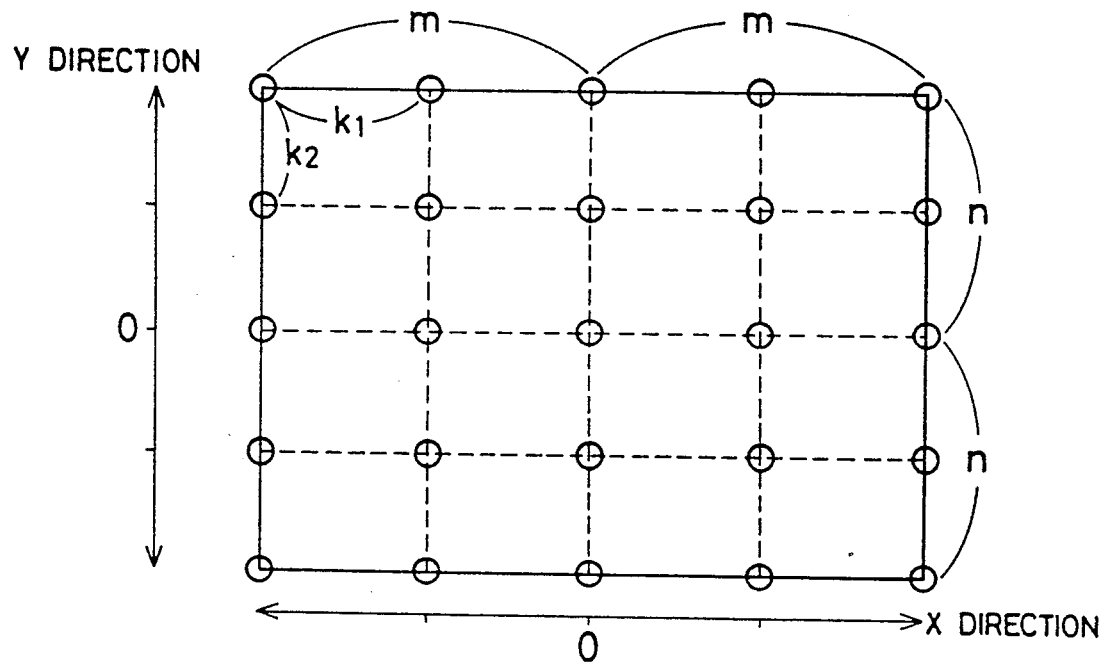
FIG. 20 is a view illustrating the deployment of search motion vectors during motion vector detection by use of a mean value pattern.

Motion vector detection is then carried out as outlined by the flowchart in FIG. 17. In step S1, i.e., in the first stage of search, the least distortion block is searched for through the search motion vectors in accordance with the mean value block size (FIG. 20).

In step S2, the mean value pattern 42 is calculated beforehand for the input block 23 by the mean value calculation circuit 41. Between the input block mean value pattern and the mean value pattern of the preceding frame corresponding to the block in the motion vector position, the mean value pattern matching circuit 44 performs matching distortion calculation and least distortion block detection (FIG. 19).

The mean value distortion is given by the following expression:

$$dq = \sum_{I=1}^{J} |ai - ayi| \qquad (107)$$

It is assumed here that the input block mean value pattern $A = \{a1, a2, \ldots aJ\}$ and that the reproduction frame mean value pattern $Ay = \{ay1, ay2, \ldots aJ\}$.

Given the above settings, if mean value pattern matching is utilized, it takes $l1 \times l2$ machine cycles to calculate the mean value for each input block and reproduction frame block, and it takes J machine cycles to carry out each pass of mean value pattern matching.

Thus in the first stage of search, the required amount of operation C1 is given as $$C1 = (l1 \times l2) \times (M1+1) + M1 \times J \times a + M1 \times b \qquad (108)$$

Here, M1 stands for the number of motion vectors in the first stage of search.

Figure 21:
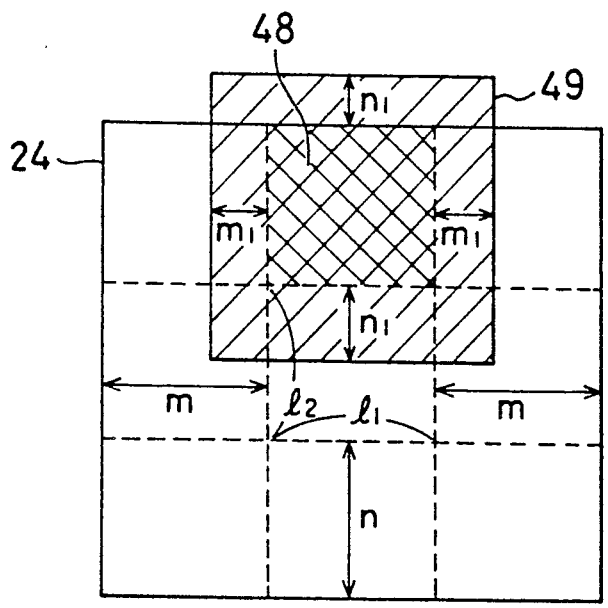
FIG. 21 is a view describing how motion vector detection is carried out in the second stage of search within the range defined by motion vector detection in the first stage of search.

Step S3 is a motion detection step to be performed by the pixel pattern matching circuit 46. As shown in FIG. 21, a delimited search range 49 measuring $m1 \times n1$ is set around the least distortion block obtained by the mean value pattern matching circuit 44. Within this range, motion vectors to be searched for are disposed at a high concentration.

The amount of operation C2 within the delimited search range 49 is given as the sum of the following:

$$\{(2m1+1)(2n1+1) \times L \times a\} \qquad (109)$$

and $$(2m1+1)(2n1+1) + b \text{ (compare operation)}$$

where, $l1=8$; $l2=8$; $m=8$; $n=8$; $k1=4$, $k2=4$ for a mean value block; and operation machine cycle counts $a=1$ (absolute differential value) and $b=2$ (compare operation). Given these settings, the number of vectors to be searched for (M1) is 25, while $J=4$.

Therefore, the required amount of operation C1 in the first stage of search is about 1,800 machine cycles.

In the second stage of search, where the search range is delimited by $m1=3$, $n1=3$, the required amount of operation C2 is about 3,200 machine cycles.

As indicated above, the amount of operation per input block is 5,000 machine cycles. This is about one fourth of the amount of operation conventionally required for full or total search.

The above-described embodiment illustratively involves dividing the current input block into small blocks and using a mean value pattern based on the mean value of pixels as a sample data pattern in each small block. However, the present invention is not limited to this embodiment; it can also be embodied so as to provide the same effects when using a sample data pattern that represents the value of pixels in specific positions within the small block.

Figure 22:
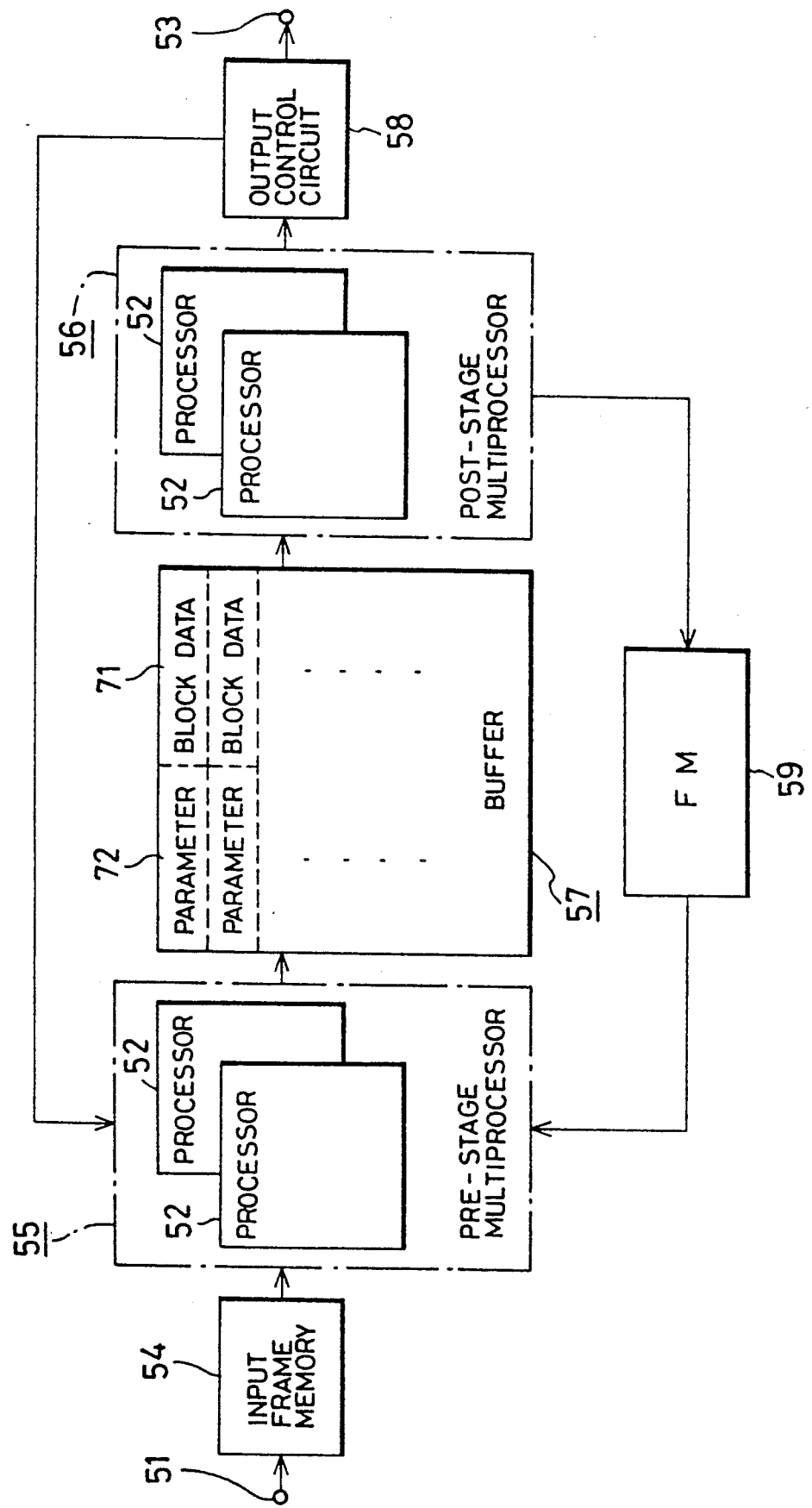
FIG. 22 is a block diagram of a video coding system as a third embodiment of the present invention.

A third embodiment of the present invention will now be described by referring to the accompanying drawings. In FIG. 22, reference numerals 51 and 53 are the input and the output terminal, respectively, mentioned earlier; 54 is an input frame memory that stores input data admitted through the input terminal 51; and 55 is a pre-stage multiprocessor which, connected to the input frame memory 54, comprises a plurality of processors 52 that may be expanded in parallel depending on the amount of processing to be performed. The pre-stage multiprocessor 55 codes all pixels of the data that is input from the input terminal 51. The multiprocessor 55 is also capable of adding significant/insignificant block information and intraframe position information to block data. Reference numeral 56 is a post-stage multiprocessor comprising a plurality of processors 52 that may also be expanded in parallel depending on the amount of processing to be performed. The post-stage multiprocessor 56 codes only significant blocks in the data that is input from the input terminal 51. The multiprocessor 56 is also capable of identifying significant blocks and re-composing frames based on the significant/insignificant block information and position information added by the pre-stage multiprocessor 55 to the block data.

Reference numeral 57 is a buffer disposed between the pre-stage multiprocessor 55 and the post-stage multiprocessor 56. The buffer 57 stores the coded data output by the pre-stage multiprocessor 55 and absorbs the difference in processing time between the two multiprocessors 55 and 56. Reference numeral 58 is an output control circuit which is connected to the post-stage multiprocessor 56 and receives the coded data therefrom. By sending feedback data to the pre-stage multiprocessor 55, the output control circuit 58 adjusts the threshold value for control over the amount of data to be coded. In this manner, the amount of coded data generated by the pre-stage multiprocessor 55 is held constant. At the same time, the output control circuit 58 varies the number of significant blocks depending on the quantity of data accumulated in the buffer 57, keeps constant the output of the post-stage multiprocessor 56, and transmits output data via the output terminal 53. Reference numeral 59 is a coding frame memory which, connected to the post-stage multiprocessor 56, stores the decoded data coming therefrom and sends it to the pre-stage multiprocessor 55 during the next frame processing.

Reference numeral 71 is block data which, having been processed by the pre-stage multiprocessor 55, is placed in the buffer 57. Reference numeral 72 is a collection of parameters that are added to each piece of block data 71; they indicate the attributes thereof.

The operations involved will now be described. The coding process that applies to the present invention may be divided into two stages: a pre-stage process in effect before conditional picture-element replenishment or compensation is performed, and a post-stage process that follows the pre-stage process. In that case, the expressions below indicate the relationship between the ratio of significant blocks α for the pre-stage or post-stage process and the processing time T:

$$T = C \text{ (for pre-stage process)} \ldots \qquad (3)$$

where, C is a constant;

$$T = A\alpha \text{ (for post-stage process)} \ldots \qquad (4)$$

where, A is a constant.

Figure 23:
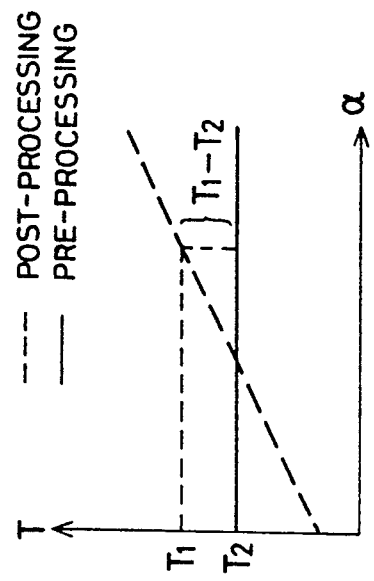
FIG. 23 is a view depicting the relationship between the processing time and the significant block ratio for the third embodiment.

FIG. 23 illustrates what the above expressions (3), and (4) represent. As indicated, the coding process is composed of the pre-stage process and the post-stage process. The pre-stage process is a process in which the processing time remains constant regardless of the significant block ratio $\alpha$. In the post-stage process, the processing time is proportional to the significant block ratio $\alpha$. The pre-stage and the post-stage process are carried out respectively by the pre-stage multiprocessor 55 and the post-stage multiprocessor 56. Each multiprocessor is capable of being expanded in parallel depending on the amount of processing to be performed.

Input data is entered through the input terminal 51 into the input frame memory 54. The input data is then subjected to the pre-stage process in which motion compensation, conditional pixel compensation, etc. are carried out. The result is output to the buffer 57. The processors 57 that make up the pre-stage multiprocessor 55 admit block data from the input frame memory 54 in the order in which the data was processed. Because the processing time varies for each of the processors 52 depending on the block data, the order in which the data is output to the buffer 57 is not the same as the order in which the input frame memory 54 is scanned. Thus the data that is output to the buffer 57 from the processors 52 is given the position information indicating its intraframe position plus the significant/insignificant block information and data type information.

The block data placed in the buffer 57 is subjected to the post-stage process including vector quantization, discrete COS transformation and decoding. The coded data is output to the output control circuit 58 and the decoded data to the coding frame memory 59. At this point, the information added to the data is referenced and only the significant blocks are processed accordingly. The decoded data placed in the coding frame memory 59 is sent to the pre-stage multiprocessor 55 for coding of the next frame. The output control circuit 58 transmits feedback data to the pre-stage multiprocessor 55 for control over the threshold value in the pre-stage process. This keeps the amount of coded data constant. Furthermore, the output control circuit 58 monitors the quantity of data placed in the buffer 57 and, depending on the detected quantity of accumulated data, varies the number of significant blocks. This keeps the amount of processing constant in the post-stage process, thereby reducing the work load of the post-stage multiprocessor 56.

As shown in FIG. 23, there is a difference between the pre-stage processing time $T_1$ and the post-stage processing time $T_2$. This processing time difference $(T_2 - T_1)$ is absorbed by the buffer 57 placed between the pre-stage multiprocessor 55 and the post-stage multiprocessor 56. This arrangement provides the processing performance closely approximating the maximum processing capacity of the pre-stage multiprocessor 55 or of the post-stage multiprocessor 56. As a result, the idle time indicated in FIG. 9 by broken line as an area is eliminated.

Figure 1:
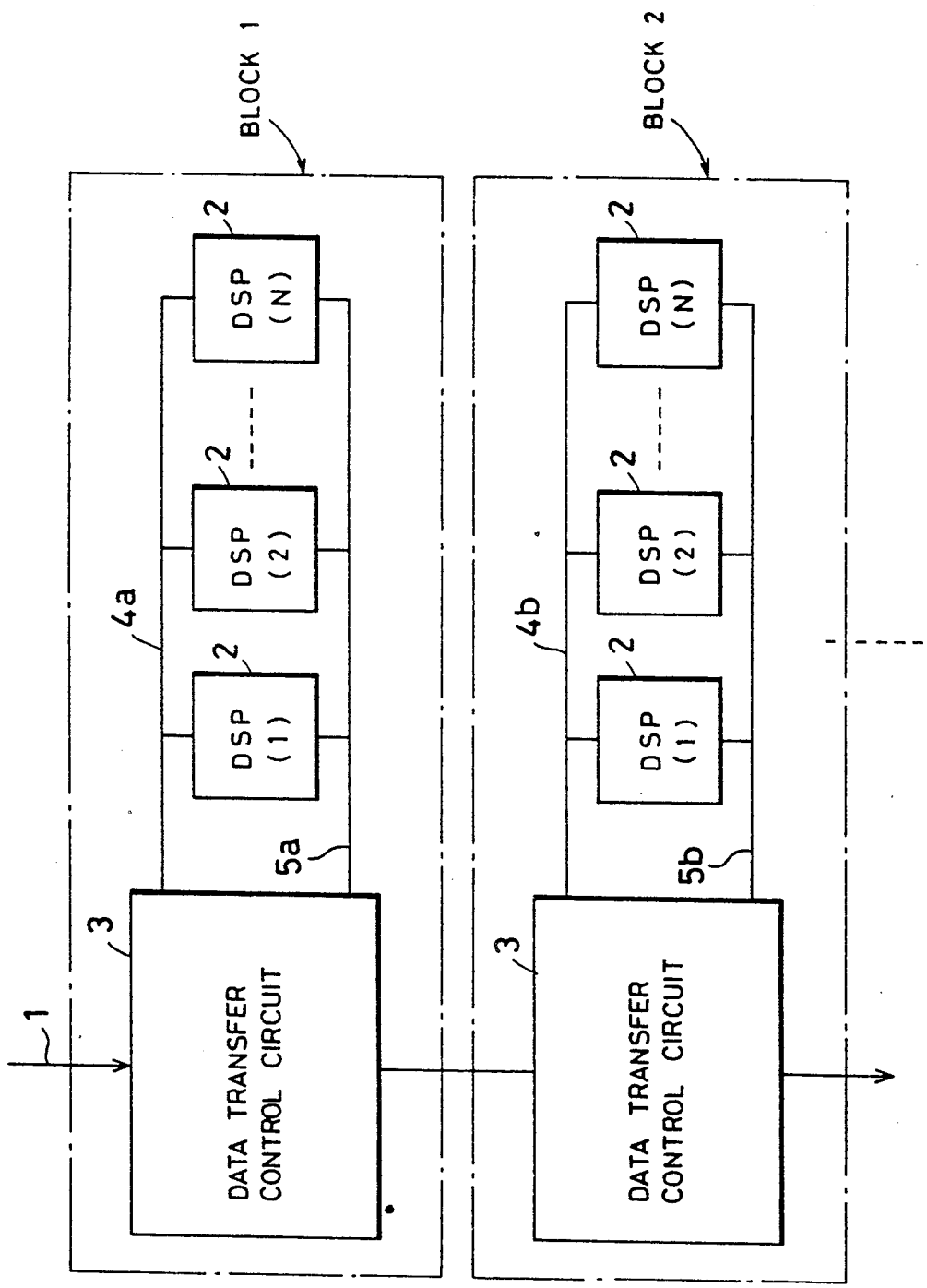
FIG. 1 is a block diagram of the video coder embodying part of the prior art video codec system.
Figure 5:
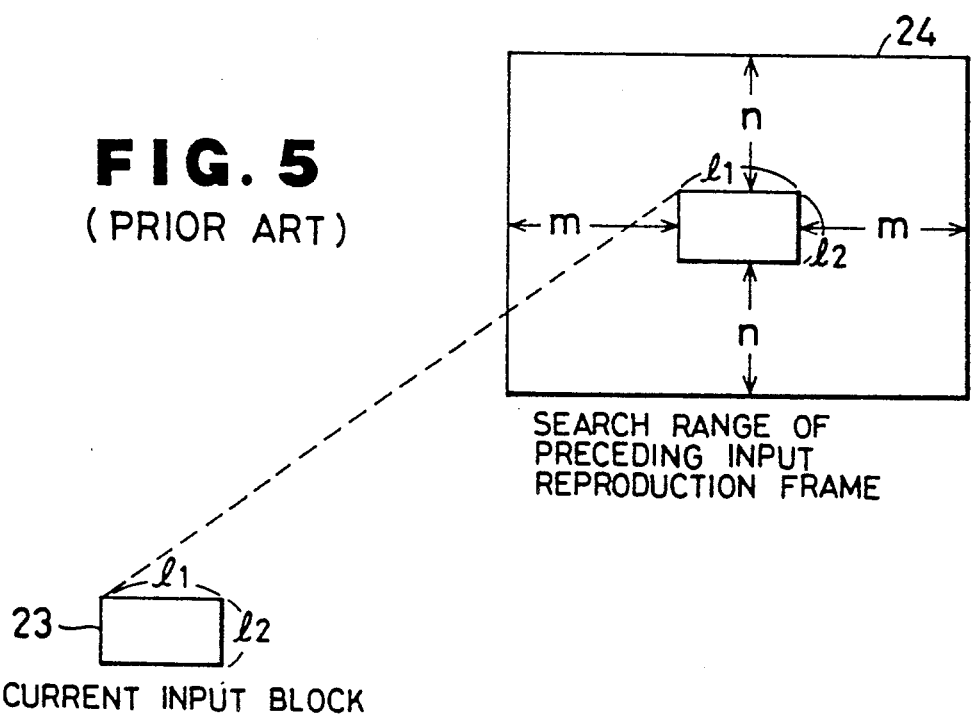
FIG. 5 is a view describing the prior art full or total search type motion vector detection method.
Figure 6:
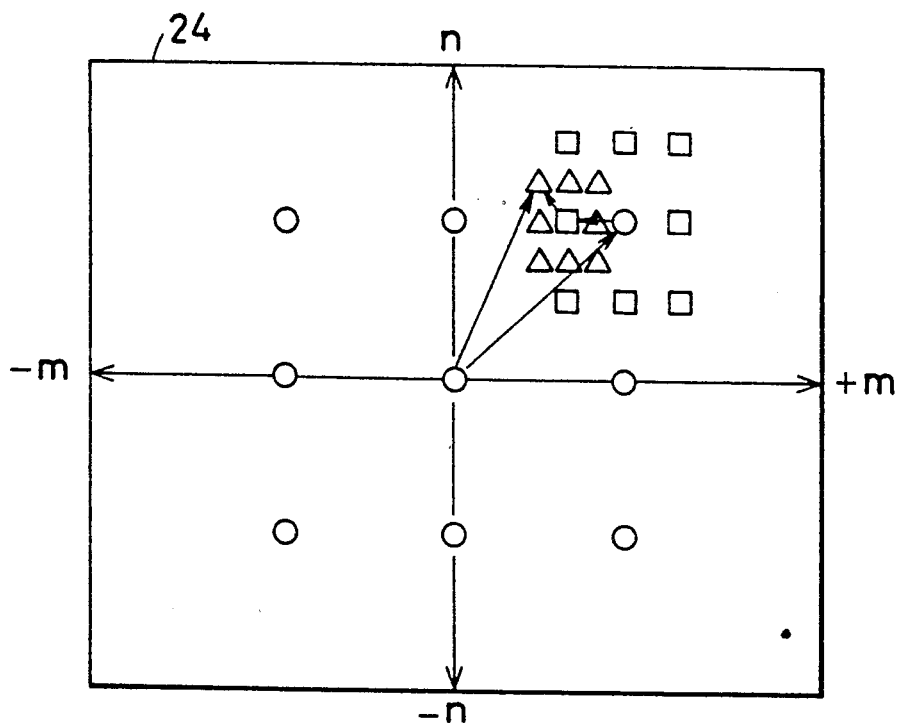
FIG. 6 is a view explaining the prior art tree search type motion vector detection method.
Figure 8:
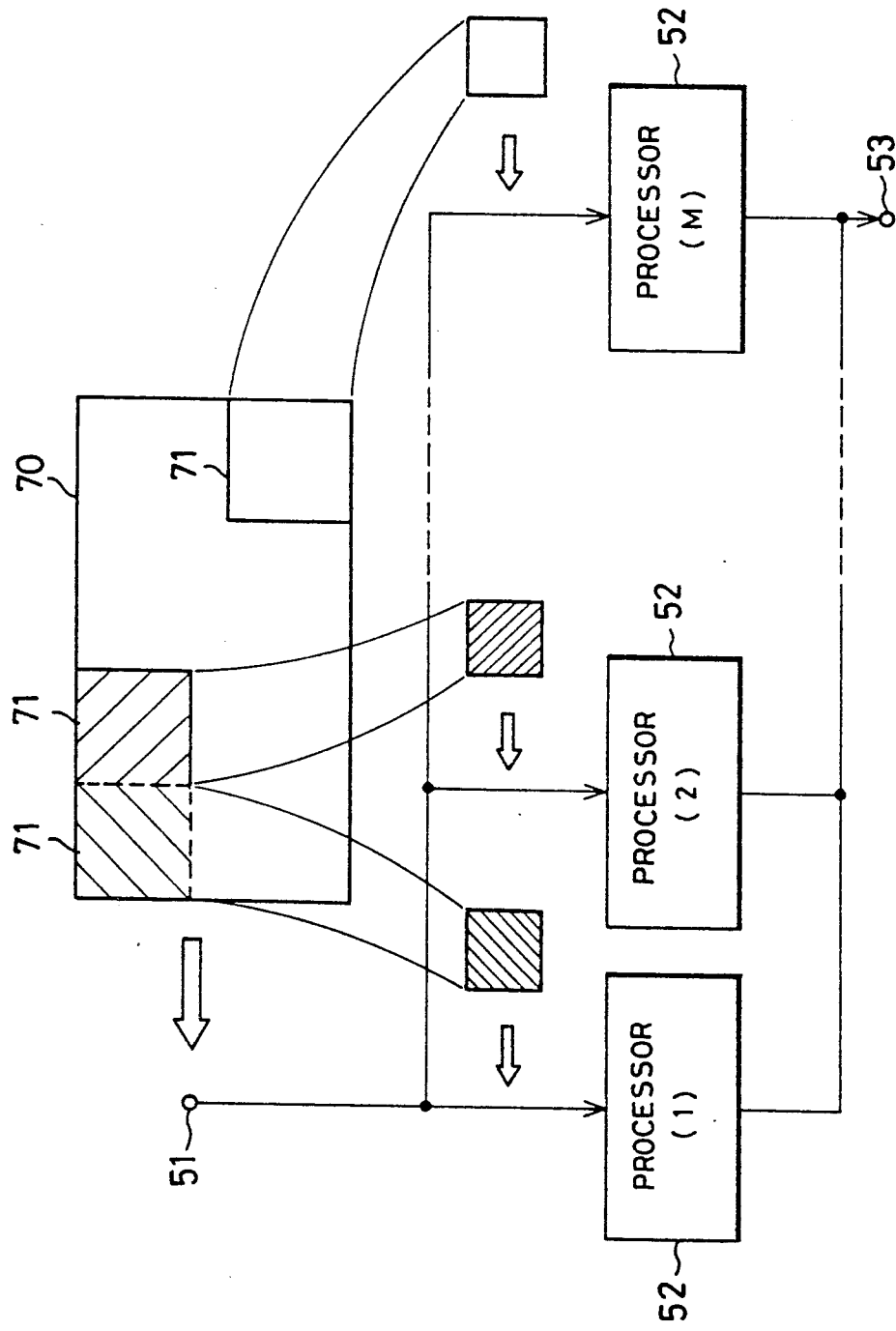
FIG. 8 is a block diagram depicting the prior art video coder.
Figure 10:
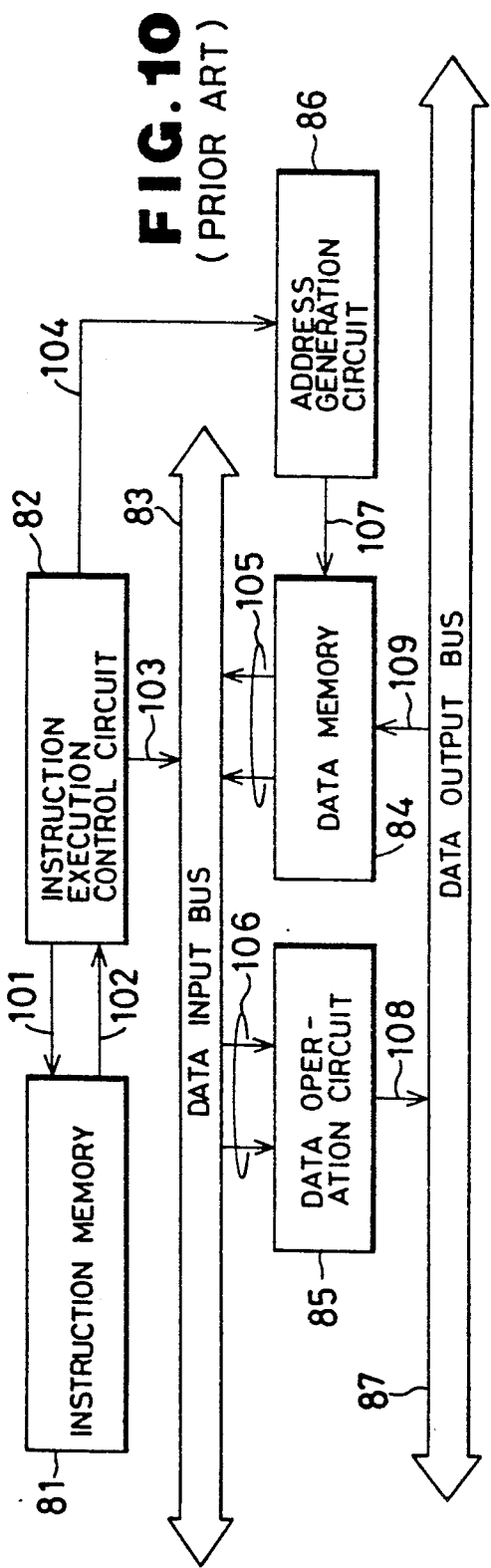
FIG. 10 is a block diagram illustrating the construction of the prior art digital signal processing system.

A fourth embodiment of the present invention will now be described by referring to the accompanying drawings. FIG. 24 is a block diagram depicting the construction of the digital signal processing system as the fourth embodiment of the invention. It is to be understood that like or corresponding parts in the fourth embodiment and the prior art digital signal processing system in FIG. 10 are given like reference characters, and that the description of these parts is omitted.

In FIG. 24, reference numeral 88 is a limiting circuit that directly admits the operation result data coming from the data operation circuit 85 via the data path 108. The limiting circuit 88 then limits the data to the number of significant bits designated by the instruction execution control circuit 82 via a data path 110.

Figure 25:
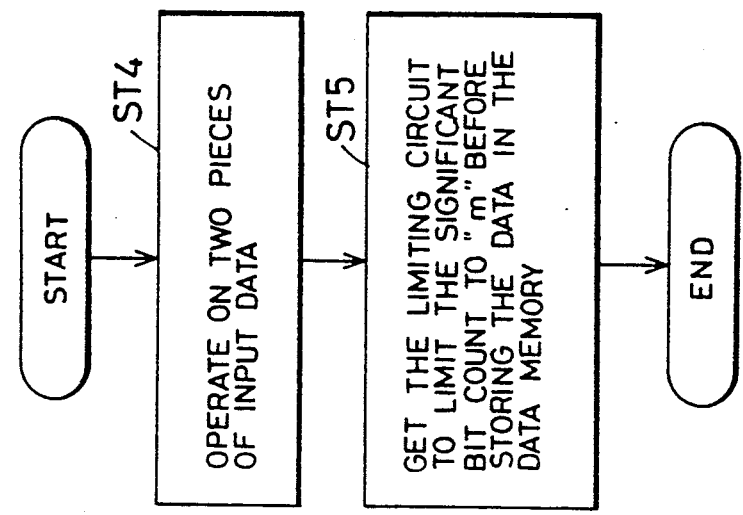
FIG. 25 is a flowchart outlining how the digital signal processing system according to the invention works.

The operations involved will now be described by referring to the flowchart in FIG. 25. There may be assumed a case in which two pieces of input data comprising "n" bits, "n" being an integer greater than zero, are subjected to a binary operation performed by the data operation circuit 85. The data resulting from the operation (comprising "n" bits) is subjected to a limiting process whereby the "m" bits, "m" being an integer equal to or smaller than "n" are made to constitute the significant bit count. The case above will now be described.

The instruction execution control circuit 82 notifies the instruction memory 81 of the address designated via the address path 101. After interpreting the corresponding instruction word, the instruction execution control circuit 82 sends a control signal over the data path 104 to the address generation circuit 86. At the same time, the circuit 86 transmits data or the like over the data path 103 onto the data input bus 83, and informs the limiting circuit 88 of the significant bit count via the data path 110.

The control signal causes the address generation circuit 86 to notify the data memory 84 of the addresses of the two pieces of input data ("n" bits each) to be operated on. In turn, the data memory 84 sends the two pieces of input data over the data path 105 onto the data input bus 83. The data operation circuit 85 admits, via the data path 106, the two pieces of input data from the data input bus 83. At this point, in step ST4, the circuit 85 performs on the data the binary operation which is designated by the instruction execution control circuit 82 via the data path 103. The operation result data ("n" bits) is output directly to the limiting circuit 88 over the data path 108. The limiting circuit 88, in step ST5, limits the operation result data to the significant bit count "m" designated by the instruction execution control circuit 82 via the data path 110 The limited operation result data is placed onto the data output bus 87 via a data path 111. This operation result packet sent over the data output bus 87 is input to the data memory 84 via the data path 109. The packet is stored at the address given again by the address generation circuit 86 via the data path 107. This completes step ST5. In the steps described above, one instruction allows both the operation and the limiting process to be performed.

As described, according to the present invention, sub-sampled video data is input consecutively in units of frames. The data is coded in parallel by coding circuits. All of the coded video data is selected or a part thereof is adaptively selected for composition in accordance with the resolution of the receiving side. Upon transmission, the data is sub-sampled again depending on the number of coding circuits that the receiving side possesses. The sub-sampled parts of the data are consecutively given headers when transmitted. This arrangement substantially averages the numbers of significant pixels among the coding circuits and minimizes the overall processing time accordingly. Furthermore, it is possible to establish connection with a receiving side with low resolution and to eliminate the conventionally experienced time difference in reception and coding.

This makes it possible to reduce the receiving buffer capacity.

Also according to the present invention, the amount of pattern-to-pattern distortion for the intrablock mean value may be used to localize the range in which to search for motion vectors. This prevents matching errors during the localizing. Because highly concentrated motion vector search is carried out within the localized area, the amount of operation is reduced and the necessary hardware is simplified accordingly. This in turn constitutes a motion compensation method capable of detection motion vectors with high precision.

Further according to the present invention, a pre-stage multiprocessor and a post-stage multiprocessor are provided to separately perform two processes: coding all pixels, and coding only significant blocks. With a threshold value controlled, the amount of coded data from the pre-stage multiprocessor is kept constant accordingly. A buffer is provided to absorb operational differences between the two multiprocessors. Depending on the amount of data accumulated in the buffer, the number of significant blocks is varied so as to keep constant the output of the post-stage multiprocessor. This arrangement eliminates the need to set the processing time for the least favorable value. Because each of the processors configured is always tapped to capacity in performance, the number thereof required for the necessary processing may be reduced.

Still according to the present invention, operation result data that is output by a data operation circuit is directly input to a limiting circuit. The limiting circuit then limits the data to a suitable significant bit count designated by an instruction execution control circuit. This arrangement allows a single instruction to perform both the operation and the limiting process. This provides for a digital signal processing system capable of an efficient limiting process.

What is claimed is:

1. A video codec system having "n" coding means disposed in parallel for coding video data, said system comprising:
    inputting a single frame of data obtained by sub-sampling "n" pieces of video data per frame, each piece of said sub-sampled video data being transmitted consecutively after being given a header;
    coding "n" pieces of said sub-sampled video data by use of said "n" coding means;
    composing all of or adaptively a selected part of said "n" pieces of said coded video data; and
    sub-sampling "m" pieces of said composed coded video data, each piece being given a header consecutively when transmitted.

2. A motion compensation system in an interframe coding system comprising a motion compensation means which divides into a plurality of blocks a current input frame of digital video data having a plurality of frames consecutively input over time, which calculates pattern-to-pattern approximations between each block of video data in said current input frame and the blocks in the preceding input frame coded reproduction data, and which detects therebetween the block and motion vector involving the least distortion, said least distortion block acquired by said motion compensation means being used as a predictive signal for data codec processing by said interframe coding system, said motion compensation system comprising a sampling circuit means and a sample data memory means, said sampling circuit means dividing said reproduction data into blocks small enough to equally divide said input block, said sampling circuit means further extracting as samples the mean value of pixels in said small blocks or the value of pixels in specific positions, said sample data memory means storing at least one frame of sample values extracted by said sampling circuit means, said motion compensation means finding a sample data pattern made up of the mean value or specific pixel value per small block with respect to said input block in the same manner as said sampling circuit means does, said motion compensation means having first search motion vectors located to surround the position of said input block within said reproduction frame data in a manner that said location constitutes a multiple of said small block during detection of said motion vectors, said sample data memory means being accessed to read out an intrablock sample data pattern in the position indicated by said motion vectors, said sample data pattern being used to calculate the amount of distortion which represents the degree of pattern similarity between said data pattern and the sample data pattern of said input block, said amount of distortion being used to detect the first search motion vector that provides the least distortion, said first search motion vector being surrounded by highly concentrated second search motion vectors, said second search motion vectors being used to calculate said amount of distortion between the intrablock pixel pattern in said reproduction frame and the pixel pattern in said input block, said amount of distortion being used to detect the least distortion block and the motion vector associated therewith, said least distortion block and said motion vector being output respectively as the final predictive signal and motion vector.

3. A video coding system comprising:
    a pre-stage multiprocessor composed of a plurality of processors which code all pixels of input data and which may be expanded in parallel depending on the amount of processing to be performed, said pre-stage multiprocessor being capable of adding significant/insignificant block information and intraframe position information to block data;
    a post-stage multiprocessor composed of a plurality of processors which code only significant blocks in said input data and which may be expanded in parallel depending on the amount of processing to be performed, said post-stage multiprocessor being capable of identifying significant blocks based on said significant/insignificant block information attached to said block data and of recomposing frames based on said position information attached to said block data;
    a buffer means which, located between said pre-stage multiprocessor and said post-stage multiprocessor, stores coded data output by said pre-stage multiprocessor and which absorbs processing time differences between said two multiprocessors; and
    an output control circuit means which adjusts a threshold value for control over the amount of coded data generated by said pre-stage multiprocessor in order to keep constant the output thereof, and which keeps constant the amount of processing performed by said post-stage multiprocessor by varying the number of said significant blocks depending on the quantity of data accumulated in said buffer means.

* * * * *

UNITED STATES PATENT AND TRADEMARK OFFICE
CERTIFICATE OF CORRECTION

PATENT NO. : 5,130,797
DATED : July 14, 1992
INVENTOR(S) : Tokumichi Murakami et al.

It is certified that error appears in the above-identified patent and that said Letters Patent is hereby corrected as shown below:

Column 3, line 64, after "search" insert --motion--.

Column 5, line 13, after "follows" insert a colon --:--.

Column 6, line 48, after "operation" insert --involved-- and after "path" delete "involved".

Column 7, line 58, after "DSP's" delete the comma ",".

Column 9, line 8, after "embodied" insert a period --.--;
line 10, after "coding" delete the semicolon ";";
line 11, after "coding" delete the semicolon ";";
line 13, after "coding" delete the semicolon ";";
line 16, after "for" insert --composition--;
line 46, after "coding" delete the semicolon ";";
line 47, after "coding" delete the semicolon ";";

Column 12, line 55, "picture-element" should be --pixel (picture-element)--.

UNITED STATES PATENT AND TRADEMARK OFFICE
CERTIFICATE OF CORRECTION

PATENT NO. : 5,130,797

DATED : July 14, 1992

INVENTOR(S) : Tokumichi Murakami et al.

It is certified that error appears in the above-identified patent and that said Letters Patent is hereby corrected as shown below:

Column 13, line 3, after "process" insert --by the characteristics of process time--;
line 16, after "pixel" insert --(picture-element) replenishment or--.

Signed and Sealed this

Twenty-eighth Day of September, 1993

Attest:

BRUCE LEHMAN

*Attesting Officer*  *Commissioner of Patents and Trademarks*